(12) United States Patent
Vivanco et al.

(10) Patent No.: US 8,767,557 B1
(45) Date of Patent: Jul. 1, 2014

(54) DETERMINING A DATA FLOW METRIC

(75) Inventors: Daniel Vivanco, Sterling, VA (US); Yu Zhou, Herndon, VA (US); Shahzada Rasool, Sterling, VA (US); Muhammad Ahsan Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 97 days.

(21) Appl. No.: 13/619,916

(22) Filed: Sep. 14, 2012

(51) Int. Cl.
*H04W 72/04* (2009.01)
*H04L 12/26* (2006.01)
*H04W 4/00* (2009.01)
*H04W 28/10* (2009.01)

(52) U.S. Cl.
USPC ........... 370/241; 370/252; 370/253; 370/232; 370/329; 370/338; 455/450; 455/452.2

(58) Field of Classification Search
None
See application file for complete search history.

(56) References Cited

U.S. PATENT DOCUMENTS

| | | | |
|---|---|---|---|
| 8,199,654 B2* | 6/2012 | Francisco et al. | 370/238 |
| 8,385,205 B2* | 2/2013 | Kenney | 370/235.1 |
| 8,411,353 B2* | 4/2013 | Kashyap et al. | 359/326 |
| 8,483,701 B2* | 7/2013 | Monnes et al. | 455/453 |
| 8,509,166 B2* | 8/2013 | Kerpez et al. | 370/329 |
| 8,644,237 B2* | 2/2014 | Vadlamudi | 370/329 |
| 2005/0163053 A1* | 7/2005 | Paton et al. | 370/241 |
| 2007/0115918 A1* | 5/2007 | Bodin et al. | 370/352 |
| 2013/0077575 A1* | 3/2013 | Vadlamudi | 370/329 |
| 2013/0089038 A1* | 4/2013 | Hannu et al. | 370/329 |

\* cited by examiner

*Primary Examiner* — Candal Elpenord (57) ABSTRACT

In a system and method of determining a data flow metric in a wireless communication system, sending a plurality of test packets to a plurality of wireless devices in communication with an access node, determining a first inter-arrival gap and a first physical resource block-to-transmission time interval (PRB-TTI) ratio for each wireless device during a first time period, and a first comparison of the first inter-arrival gap to the first PRB-TTI ratio for each wireless device, determining a second inter-arrival gap and a second PRB-TTI ratio for each wireless device during a second time period, and a second comparison of the second inter-arrival gap to the second PRB-TTI ratio for each wireless device, and determining whether a data flow metric of the access node meets a data flow criteria based on the first and second comparisons.

18 Claims, 7 Drawing Sheets

DETERMINING A DATA FLOW METRIC

TECHNICAL BACKGROUND

The smoothness of data flow in communication networks, and wireless communication network in particular, can vary based on a variety of factors. A data flow can be referred to as bursty or subject to burstiness when it is substantially non-constant or non-smooth, or when it varies rapidly in a period of time. High variability in data flow smoothness can cause jitter and/or throughput delay in a communication network. One cause of variability in data flow in wireless communication networks is mobility of wireless devices. A wireless device moving within an area served by an access node, or moving from access node to access node, may use communication link resources differently over time. For example, a wireless device may use different carriers, or may be assigned a different modulation and coding scheme (MCS) for an assigned carrier. Since data flow characteristics can affect the performance of a communication network, characterizing the data flow of the communication system is important to network operators.

OVERVIEW

In an embodiment, a plurality of test packets is sent to a plurality of wireless devices in communication with an access node. During a first time period a first inter-arrival gap and a first physical resource block-to-transmission time interval (PRB-TTI) ratio are determined for each wireless device during a first time period, and a first comparison of the first inter-arrival gap to the first PRB-TTI ratio are determined for each wireless device. During a second time period a second inter-arrival gap and a second PRB-TTI ratio are determined for each wireless device during a second time period, and a second comparison of the second inter-arrival gap to the second PRB-TTI ratio for each wireless device. Based on the first and second comparisons, is it determined whether a data flow metric of the access node meets a data flow criteria.

DETAILED DESCRIPTION

In an embodiment, a plurality of test packets is sent to a plurality of wireless devices in communication with an access node, and during a first time period a first inter-arrival gap and a first physical resource block-to-transmission time interval (PRB-TTI) ratio are determined for each wireless device during a first time period. A first comparison of the first inter-arrival gap to the first PRB-TTI ratio are determined for each wireless device. During a second time period a second inter-arrival gap and a second PRB-TTI ratio are determined for each wireless device during a second time period, and a second comparison of the second inter-arrival gap to the second PRB-TTI ratio for each wireless device. Based on the first and second comparisons, is it determined whether a data flow metric of the access node meets a data flow criteria. In an embodiment, a data use characteristic of an application running on each wireless device can be determined, and the data flow metric can be determined based on the first and second comparisons and the determined data use characteristic of the application running on each wireless device. In an embodiment, determining the first inter-arrival gap and the first PRB-TTI ratio, the first comparison, the second inter-arrival gap-gap and the first PRB-TTI ratio, and the second comparison can be performed per carrier used by the plurality of wireless devices. In an embodiment, determining the first inter-arrival gapgap and the first PRB-TTI ratio, the first comparison, the second inter-arrival gapgap and the first PRB-TTI ratio, and the second comparison can be performed for a sector of an access node.

Figure 1:
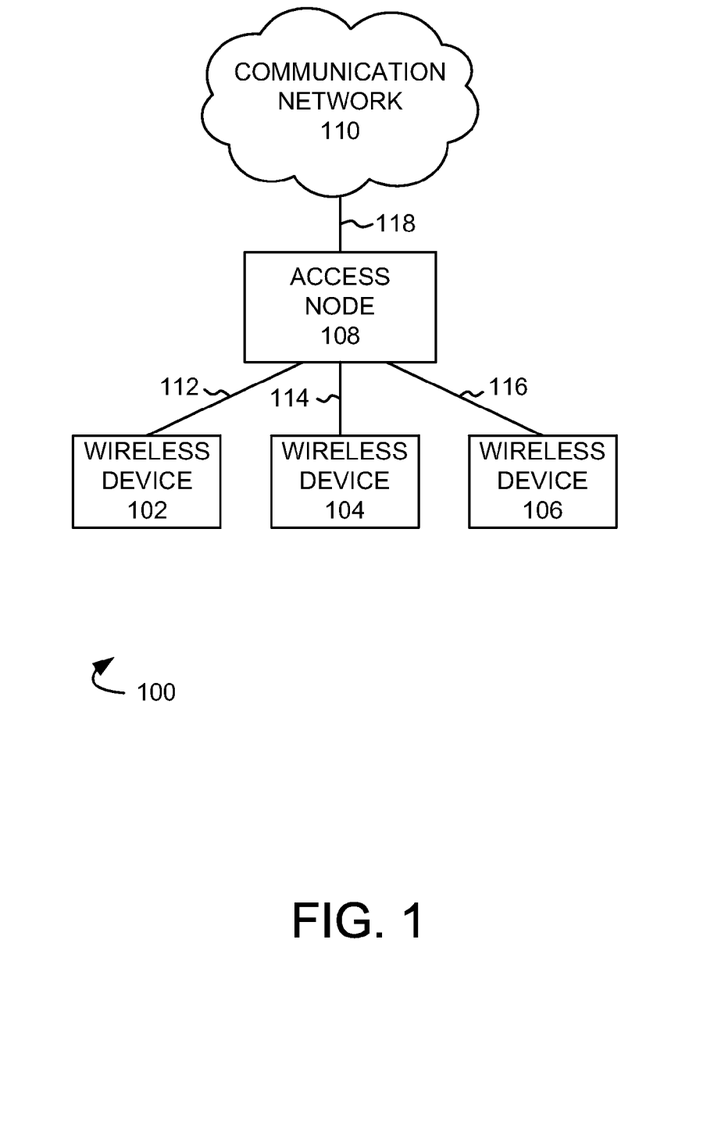
FIG. 1 illustrates an exemplary communication system to determine a data flow metric.

FIG. 1 illustrates an exemplary communication system 100 to determine a data flow metric comprising wireless devices 102,104, and 106, access node 108, and communication network 110. Examples of wireless devices 102,104, and 106 can include a cell phone, a smart phone, a computing platform such as a laptop, palmtop, or tablet, a personal digital assistant, or an internet access device, including combinations thereof. Wireless devices 102,104, and 106 are in communication with access node 108 over communication links 112, 114, and 116, respectively.

Access node 108 is a network node capable of providing wireless communications to wireless devices 102,104, and 106, and can be, for example, a base transceiver station, a radio base station, an eNodeB device, or an enhanced eNodeB device. Access node 108 is also in communication with communication network 110 over communication link 118.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 may also comprise base stations, wireless communication nodes, telephony switches, internet routers, network gateways, computer systems, communication links, or some other type of communication equipment, and combinations thereof. Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also use wireless network protocols comprising code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Communication links 112, 114, 116 and 118 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 108 and communication network 110 which are omitted for clarity, including additional processing nodes, routers, gateways, and physical and/or wireless data links for carrying data among the various network elements.

In an embodiment, a plurality of test packets is sent to a plurality of wireless devices in communication with an access node. During a first time period a first inter-arrival gap and a first physical resource block-to-transmission time interval (PRB-TTI) ratio are determined for each wireless device during a first time period, and a first comparison of the first inter-arrival gap to the first PRB-TTI ratio are determined for each wireless device. During a second time period a second inter-arrival gap and a second PRB-TTI ratio are determined for each wireless device during a second time period, and a second comparison of the second inter-arrival gap to the second PRB-TTI ratio for each wireless device. Based on the first and second comparisons, it is determined whether a data flow metric of the access node meets a data flow criteria.

Figure 2:
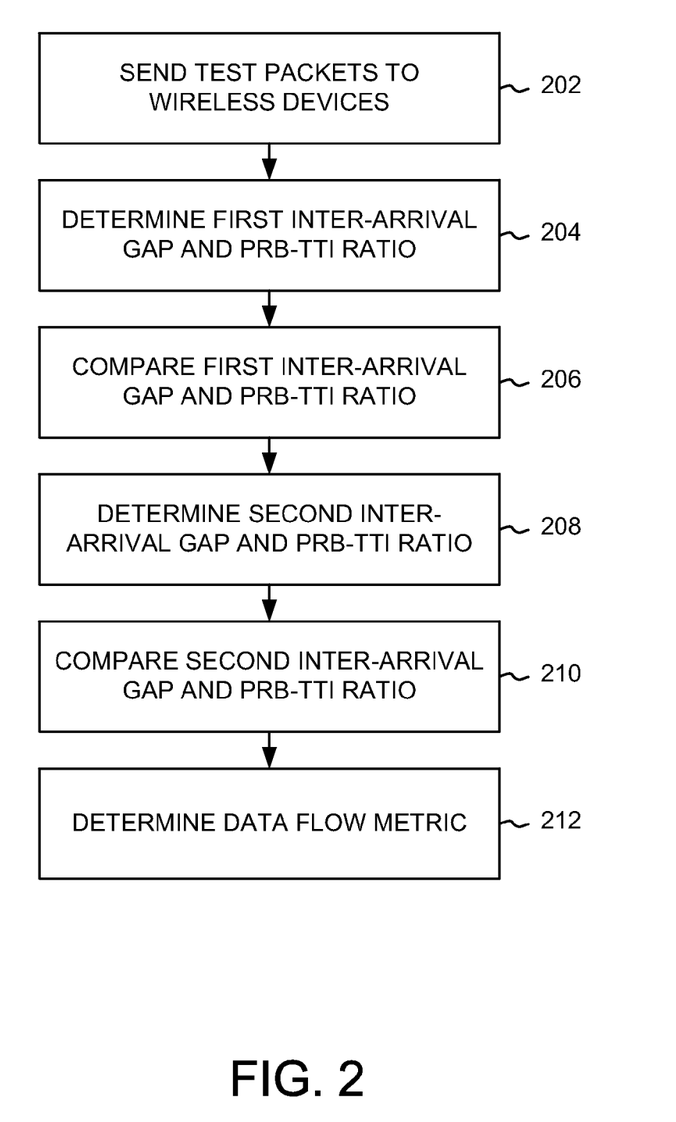
FIG. 2 illustrates an exemplary method of determining a data flow metric.

FIG. 2 illustrates an exemplary method for determining a link capacity between an access node and a wireless device. In operation 202, a plurality of test packets is sent to a plurality of wireless devices in communication with an access node. For example, a plurality of test packets can be sent to wireless devices 102, 104 and 106 when they are in communication with access node 108.

Air interface resources are allocated in physical resource blocks (PRBs) to transmit data packets to a wireless device. Data can be divided into units at a transmitter, such as access node 108, wherein the length of time required to transmit one such unit determines the transmission time interval (TTI). For example, referring to FIG. 3A, data packet 302 is illustrated occupying a plurality of physical resource blocks, which are transmitted to wireless device 102 in one TTI. Data packet 304 similarly requires a plurality of PRBs, and is transmitted to wireless device 102 over two TTIs. In an embodiment, the number of PRBs required to send a data packet can depend on the size of the packet and an assigned modulation and coding scheme (MCS), which can affect the amount of data transmissible per unit time.

An inter-arrival gap can be determined between two data packets arriving at a wireless device. An inter-arrival gap can result from network cross-traffic, that is, data traffic other than the data packets which intervenes between two consecutive transmitted packets. An increase in cross-traffic may increase an inter-arrival gap, reflecting that available capacity of a communication link may change over time based on cross-traffic volume, such that when the communication link is heavily loaded with data traffic, the probability of cross-traffic interference with the probe packets increases. Other network conditions, such as communication link congestion and air interface conditions, can also affect an inter-arrival gap. An assigned MCS can also affect an inter-arrival gap.

Data flow in a wireless communication link between an access node and a wireless device can be affected by the mobility of the wireless device. For example, a high mobility of a wireless device can increase burstiness of the data flow in the wireless communication link, a phenomenon which can be exacerbated as the number of wireless devices in communication with the access node increases. Thus, determining the mobility of a wireless device can provide an indication of data flow over a wireless communication link. The indication of data flow can provide an indication of the degree of smoothness or burstiness in the communication link.

Figure 3A:
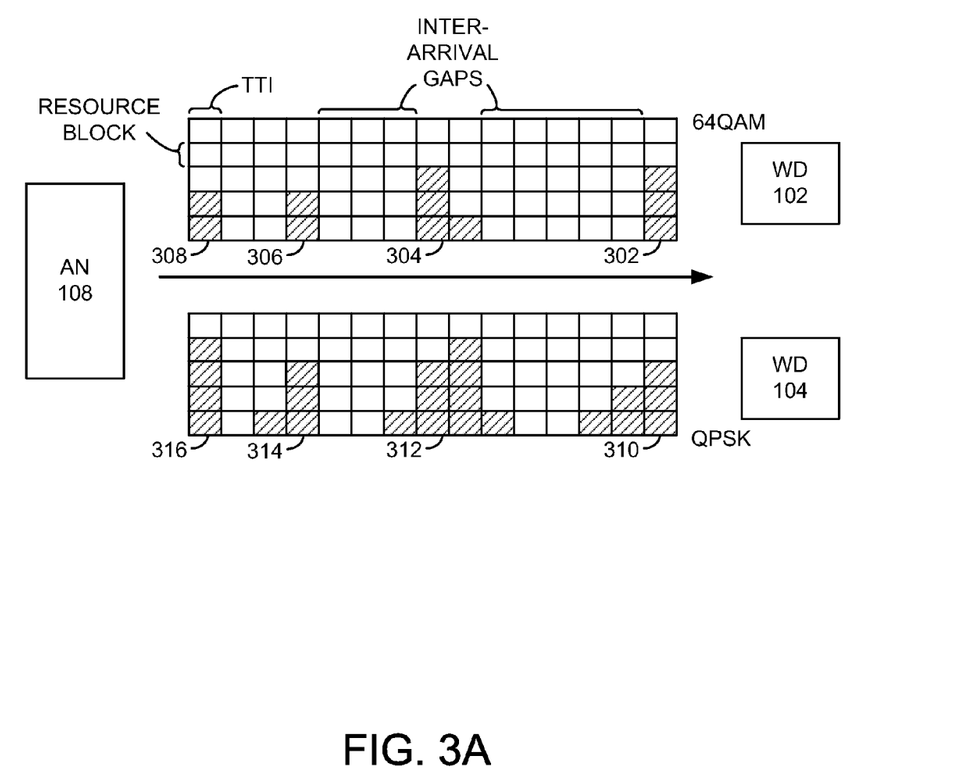
FIG. 3A illustrates an exemplary transmission of packets to wireless devices.

Returning to FIG. 2, in operation 204, a first inter-arrival gap and a first physical resource block-to-transmission time interval (PRB-TTI) ratio for each wireless device are determined during a first time period. For example, during a first time period an inter-arrival gap and a PRB-TTI ratio can be determined for wireless devices 102, 104 and 106. Referring to FIG. 3A, PRBs and TTIs required to transmit packets 302, 304, 306 and 308 to wireless devices 102, and PRBs and TTIs required to transmit packets 310, 312, 314 and 316 to wireless device 104, can be determined, and based on those determinations a PRB-TTI ratio for each of wireless device 102 and 104 can be determined. In addition, an inter-arrival gap for each of wireless device 102 and 104 can also be determined. In an embodiment, average PRBs, TTIs and inter-arrival gaps can be determined for the first time period.

In operation 206 (FIG. 2), a first comparison of the first inter-arrival gap to the first PRB-TTI ratio for each wireless device is determined. The determinations of inter-arrival gaps and PRB-TTI ratios can provide an indication of the degree of mobility of a wireless device. For example, when the inter-arrival gap is relatively large and the PRB-TTI ratio is relatively small, it can be determined that a wireless device is relatively close to access node 108. Conversely, when the inter-arrival gap is relatively small and the PRB-TTI ratio is relatively large, it can be determined that a wireless device is relatively far from access node 108 (e.g., close to an edge of an area served by access node 108). In addition, a change in the inter-arrival gap and the PRB-TTI ratio for a wireless device over time can provide an indication of the mobility of the wireless device. As mentioned above, determining the mobility of a wireless device can provide an indication of data flow over a wireless communication link.

In operation 208, a second inter-arrival gap and a second PRB-TTI ratio for each wireless device during a second time period, and in operation 210 a second comparison of the second inter-arrival gap to the second PRB-TTI ratio for each wireless device is determined. For example, during a second time period, for wireless devices 102, 104 and 106 a second inter-arrival gap and a second PRB-TTI ratio can be determined for each wireless device. In an embodiment, average PRBs, TTIs and inter-arrival gaps can be determined for the second time period.

Figure 3B:
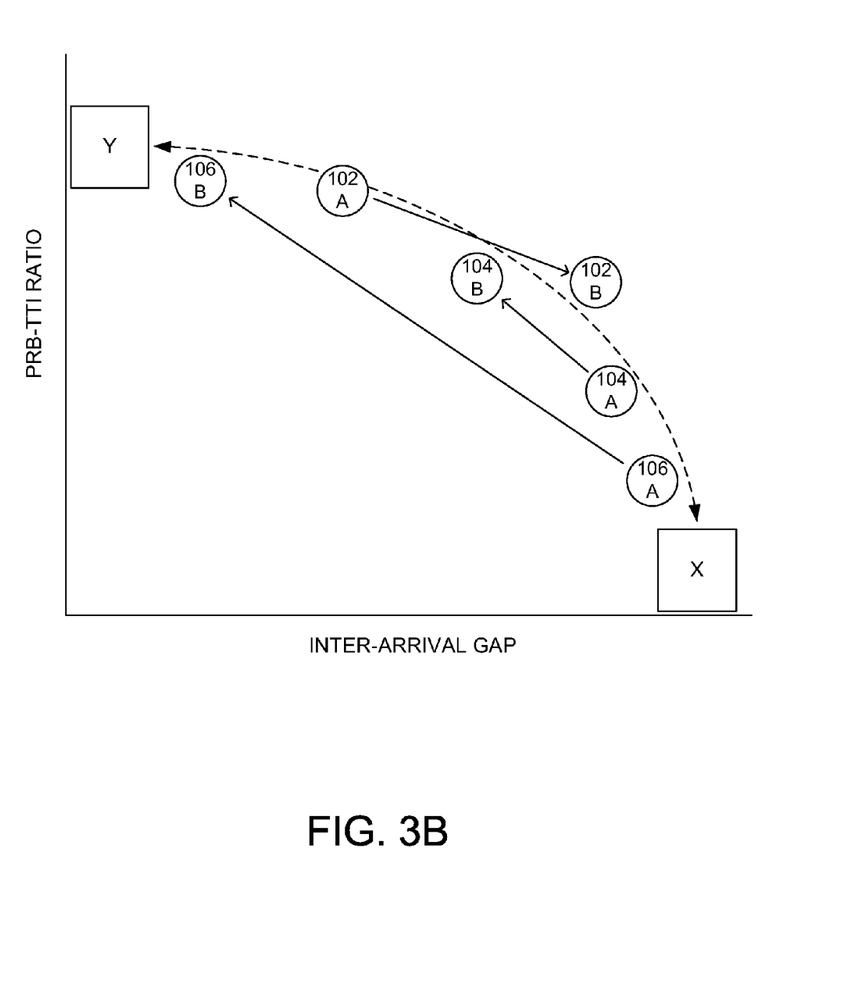
FIG. 3B illustrates exemplary comparisons of inter-arrival gaps to PRB-TTI ratios for wireless devices

Based on the first and second comparisons, a data flow metric for an access node can be determined, and it can further be determined whether the data flow metric of the access node meets a data flow criteria (operation 212). FIG. 3B illustrates exemplary comparisons of inter-arrival gap to PRB-TTI ratios for wireless devices. For a wireless device in communication with an access node, when an inter-arrival gap is relatively large and the PRB-TTI ratio is relatively small, it can be determined that a wireless device is relatively close to the access node. Conversely, when the inter-arrival gap is relatively small and the PRB-TTI ratio is relatively large, it can be determined that a wireless device is relatively far from the access node 108. A change over time in the inter-arrival gap and the PRB-TTI ratio for a wireless device can provide an indication of the mobility of the wireless device. Determining the mobility of a wireless device can provide an indication of data flow burstiness over a wireless communication link. In an embodiment, for each wireless device a first position can be plotted based on the first comparison of the first inter-arrival gap to the first PRB-TTI ratio, and a second position can be plotted based on the second comparison of the second inter-arrival gap to the second PRB-TTI ratio. A change from the first position to the second position between position X and position Y can provide an indication of the degree of mobility of a wireless device, as well as its location and direction.

In an embodiment, the position can comprise a centroid based on a plurality of determinations of inter-arrival gaps, PRB-TTI ratios, and comparisons thereof. For example, FIG. 3B illustrates first position 102A and second position 102B for wireless device 102. The change in location from centroid 102A to centroid 102B indicates that wireless device 102 has moved away from access node 108 and closer to the edge of the coverage area of access node 108. For wireless device 104, the difference in location from first position 104A to second position 104B provides an indication that wireless device 104 has moved closer to access node 108. For wireless device 106, the difference in location from first position 106A to second position 106B provides an indication that wireless device 106 has moved from near the edge of the area served by access node 108 to a location relatively close to access node 108. In an embodiment, a network node such as access node 108, or another processing node, can determine the centroids and any centroid trajectory based on the determinations of inter-arrival gaps, PRB-TTI ratios, and comparisons thereof. In an embodiment, the determination of centroids and centroid trajectories can be performed by each wireless device and reported to communication system 100 through access node 108.

Returning to FIG. 2, in operation 212, based on the first and second comparisons, a data flow metric for an access node can be determined, and it can further be determined whether the data flow metric of the access node meets a data flow criteria. When the data flow metric meets the data flow criteria, the data flow metric can be further used to adjust network parameters. For example, the data flow metric can be used to adjust a network entry criteria for a wireless device requesting access to a traffic channel. As another example, the data flow metric can be used to determine additional carriers for carrier augmentation of the access node. As yet another example, the data flow metric can be used to adjust load balancing and/or traffic shaping for the access node.

Figure 4:
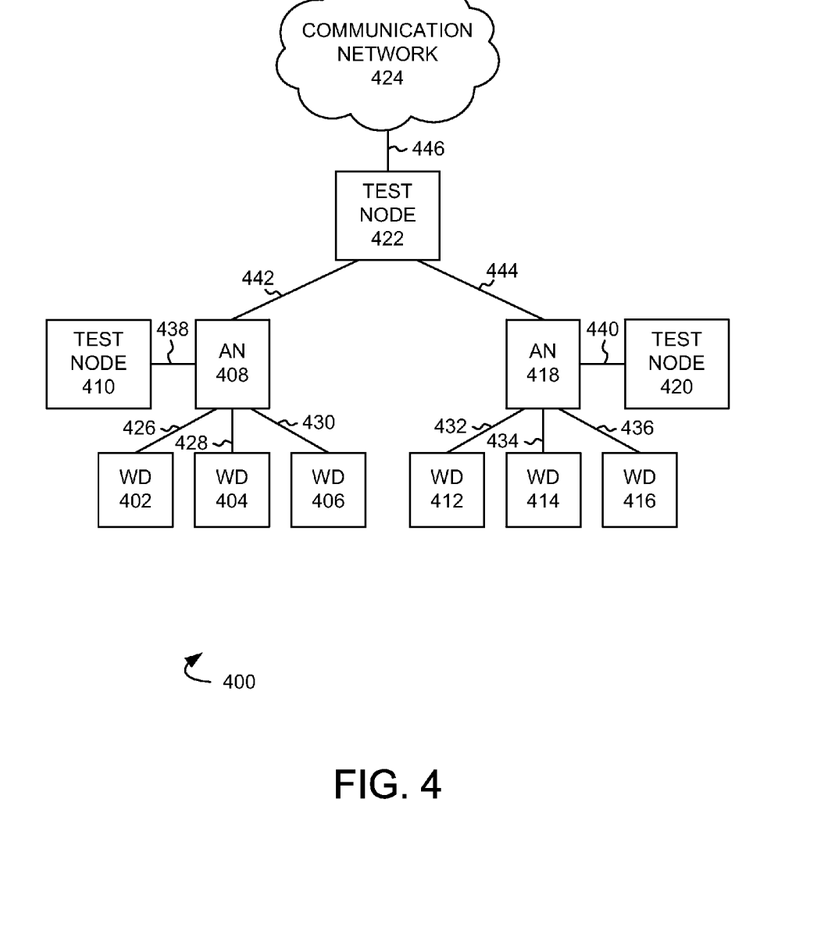
FIG. 4 illustrates another exemplary communication system to determine a data flow metric.

FIG. 4 illustrates another exemplary communication system to determine a data flow metric comprising wireless devices 402, 404, 406, 412, 414 and 416, access nodes 408 and 418, test nodes 410, 420 and 422, and communication network 424. Examples of wireless devices 402, 404, 406, 412, 414 and 416 can include a cell phone, a smart phone, a computing platform such as a laptop, palmtop, or tablet, a personal digital assistant, or an internet access device, including combinations thereof. Wireless devices 402, 404, and 406 are in communication with access node 408 over communication links 426, 438 and 430, respectively. Wireless devices 412, 414 and 416 are in communication with access node 418 over communication links 432, 434 and 436, respectively.

Access nodes 408 and 418 are a network nodes capable of providing wireless communications to wireless devices 402, 404, 406, 412, 414 and 416, and can be, for example, a base transceiver station, a radio base station, an eNodeB device, or an enhanced eNodeB device. Access node 108 is also in communication with test node 410 over communication link 438, and with test node 422 over communication link 442. Access node 418 is also in communication with test node 420 over communication link 440, and with test node 422 over communication link 444.

Test nodes 410, 420 and 422 are processing nodes configured to determine a data flow metric, for example, for an access node such as access node 408 and access node 420. Test nodes 410, 420 and 422 can comprise a processor and associated circuitry to execute or direct the execution of computer-readable instructions for managing content. Test nodes 410, 420 and 422 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In embodiments, test nodes 410, 420, and 422 can be standalone processing nodes in communication system 400. The functionality of test nodes 410, 420 an 422 can also be included in another processing node, such a s mobility management entity (MME), serving gateway (S-GW) or other gateway, a proxy node, or another processing node.

Communication network 424 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 424 may also comprise base stations, wireless communication nodes, telephony switches, internet routers, network gateways, computer systems, communication links, or some other type of communication equipment, and combinations thereof. Communication network 424 can use wired and/or wireless protocols, analogous to communication network 110.

Communication links 426, 428, 430, 432, 434, 436, 438, 440, 442, 444 and 446 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 408 and 418, test nodes 410, 420 and 422, and communication network 424 which are omitted for clarity, including additional processing nodes, routers, gateways, and physical and/or wireless data links for carrying data among the various network elements.

Figure 5:
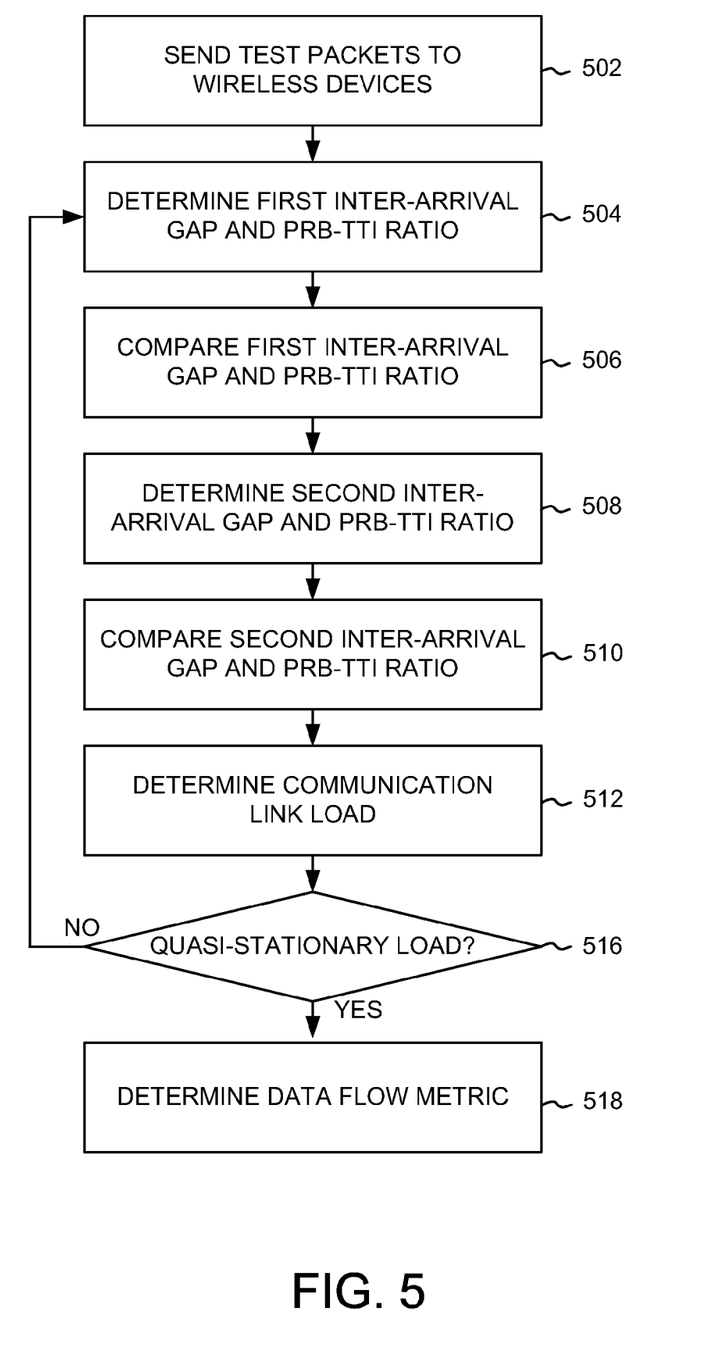
FIG. 5 illustrates another exemplary method of determining a data flow metric.

FIG. 5 illustrates another exemplary method of determining a data flow metric. In operation 502, a plurality of test packets is sent to a plurality of wireless devices in communication with an access node. For example, a plurality of test packets can be generated by test node 410 and can be sent from access node 408 to wireless devices 402, 404, and 406. In addition, a plurality of test packets can be generated by test node 420 and can be sent from access node 418 to wireless devices 412, 414 and 416. In an embodiment, the plurality of test packets can be sent with a predetermined routing priority, such as Best Effort.

In operation 504, a first inter-arrival gap and a first physical resource block-to-transmission time interval (PRB-TTI) ratio for each wireless device are determined during a first time period. For example, during a first time period an inter-arrival gap and a PRB-TTI ratio can be determined for wireless devices 402, 404, 406, 412, 414 and 416. In an embodiment, average PRBs, TTIs and inter-arrival gaps can be determined for the first time period.

In operation 506, a first comparison of the first inter-arrival gap to the first PRB-TTI ratio for each wireless device is determined. The determinations of inter-arrival gaps and PRB-TTI ratios can provide an indication of the degree of mobility of a wireless device. For example, when the inter-arrival gap is relatively large and the PRB-TTI ratio is relatively small, it can be determined that a wireless device is relatively close to access node 408 or 418. Conversely, when the inter-arrival gap is relatively small and the PRB-TTI ratio is relatively large, it can be determined that a wireless device is relatively far from access node 408 or 418. In addition, a change in the inter-arrival gap and the PRB-TTI ratio for a wireless device over time can provide an indication of the mobility of the wireless device, which can provide an indication of data flow burstiness over a wireless communication link.

In operation 508, a second inter-arrival gap and a second PRB-TTI ratio for each wireless device during a second time period, and in operation 510 a second comparison of the second inter-arrival gap to the second PRB-TTI ratio for each wireless device is determined. For example, during a second time period, for wireless devices 402, 404, 406, 412, 414, and 416 a second inter-arrival gap and a second PRB-TTI ratio can be determined for each wireless device.

In an embodiment, the first time period and the second time period are of a relatively short duration, such as a period of minutes or seconds. By using relatively short time periods, the mobility of wireless devices in communication with an access node can be isolated from other factors affecting data flow in the area served by an access node. In an embodiment the first and second time periods can be scheduled so as to determine wireless device mobility and data flow characteristics (including burstiness) during predetermined periods of time, such as a time of day known to be a high demand period, or based on other time features such as seasonality. By scheduling the first and second time periods appropriately, data flow characteristics such as time-of-day variance, seasonal variance, and the like can be determined.

In operation 512, a communication link load for communication links between an access node and the wireless devices is determined. In an embodiment, in order to determine a mobility of a wireless device based on the inter-arrival gap and PRB-TTI ratio, certain assumptions regarding other characteristics of the wireless device and the communication link can be made, such as that a wireless device is relatively stationary during the time periods in which the inter-arrival gap and PRB-TTI ratio are determined (such as the first time period and the second time period). This characteristic can also be termed quasi-stationary loading. Using the determined communication link load, in operation 516 it can be determined whether the communication link load is consistent with quasi-stationary loading, for example, based on whether there is variance in the communication link load during the first time period and/or second time period. When the communication link loading is determined to be not quasi-stationary (operation 516—NO), then the first and second inter-arrival gaps and PRB-TTI ratios are redetermined. When the communication link loading is determined to be quasi-stationary (operation 516—YES), the first and second inter-arrival gaps and PRB-TTI ratios are determined to be reliable.

In operation 518, a data flow metric can be determined based on the first and second comparisons, and further it can be determined whether the data flow metric meets a data flow criteria. In an embodiment, the determinations of inter-arrival gaps, PRB-TTI ratios, and comparisons thereof can be performed at test nodes 410 and 420, and reported to test node 422. In an embodiment, the determinations of inter-arrival gaps, PRB-TTI ratios, and comparisons, and the determination of the data flow criteria can be performed at test node 422. When the data flow metric meets the data flow criteria, the data flow metric can be further used to adjust network parameters. For example, the data flow metric can be used to adjust a network entry criteria for a wireless device requesting access to a traffic channel. As another example, the data flow metric can be used to adjust a number of carriers of the access node, for example, for carrier augmentation or reduction. As yet another example, the data flow metric can be used to adjust a load balancing criteria, and the load balancing criteria can be used in determinations of load balancing, for example, among access nodes 408 and 418. The data flow metric can be used to adjust a traffic shaping criteria, and the traffic shaping criteria can be used to adjust traffic shaping for access node 408 and/or 418. The data flow metric can also be used to determine whether to perform a handover of a wireless device from one access node to another access node (e.g., from access node 408 to access node 418, or vice versa).

In an embodiment, in operation 518, a data use characteristic can determined for an application running on each wireless device, and the data flow metric can be determined based on the first and second comparisons as well as the data use characteristic. An application running on a wireless device which uses data from communication system 400 can require data in different ways. For example, a web browsing application will send and/or receive data discontinuously, whereas a voice application (such as a VoIP application) or a streaming video will send and/or receive data relatively continuously. Thus, in an embodiment, the data flow metric can be determined based on the first and second comparisons as well as the data use characteristic.

Communication links 426, 428, 430, 432, 434 and 436 can comprise a plurality of carriers. For example, at least one of wireless devices 402, 404, 406, 412, 414 and 416 can be a multimode wireless device capable of communication with a respective access node 408, 418 over a plurality of carriers. Thus, in an embodiment, the first inter-arrival gap and the first PRB-TTI ratio, the first comparison, the second inter-arrival gap and the first PRB-TTI ratio, and the second comparison can be performed performed for each carrier used by the plurality of wireless devices. A data flow metric can thus be determined for each carrier of a plurality of carriers.

Access node 408 and/or 418 can provide communication to wireless devices in two or more sectors of a coverage area. Accordingly, the first inter-arrival gap and the first PRB-TTI ratio, the first comparison, the second inter-arrival gap and the first PRB-TTI ratio, and the second comparison can be performed for a sector of an access node.

As a wireless device moves within an access node service area, the modulation and coding scheme (MCS) assigned to the wireless device may change. The new MCS may have affect the data flow over a communication link between the wireless device and the access node Thus, in an embodiment, the first inter-arrival gap can be determined based on a first modulation and coding scheme of each of the plurality of wireless devices, and the second inter-arrival can be based on a second modulation and coding scheme of each of the plurality of wireless devices which is different than the first modulation and coding scheme.

In an embodiment, a data flow metric can be represented as:

$$\text{data flow metric} = \frac{\sum_{i=1}^{n}\sum_{j=1}^{T}(W_i)(C_{i,j} - C_{i,j-1})^2}{n*T}$$

where i represents an index of a wireless device, j represents a time period, n represents a total number of wireless devices (for example, a total number of wireless devices in communication with an access node), and T is a total time or number of time periods j. C represents a determined location of a wireless device (which, in an embodiment, can be a centroid). In addition, W represents a weighting factor which can be based on a data use characteristic of an application of a wireless device. The value of i can be adjusted based on, for example, the smoothness or burstiness of the data use characteristic of the application. As another example, the value of W can be based on a data requirement of the application, such as whether the application is delay sensitive. A minimum data requirement (or a maximum permitted delay) of the application can be determined (for example, by deep packet inspection of data from a wireless device) and a value of W can be determined based on the determined data requirement of the application. Thus, a value of W can be determined, for example, to provide more weight to a wireless device which requires (or is using) more communication link resources.

Figure 6:
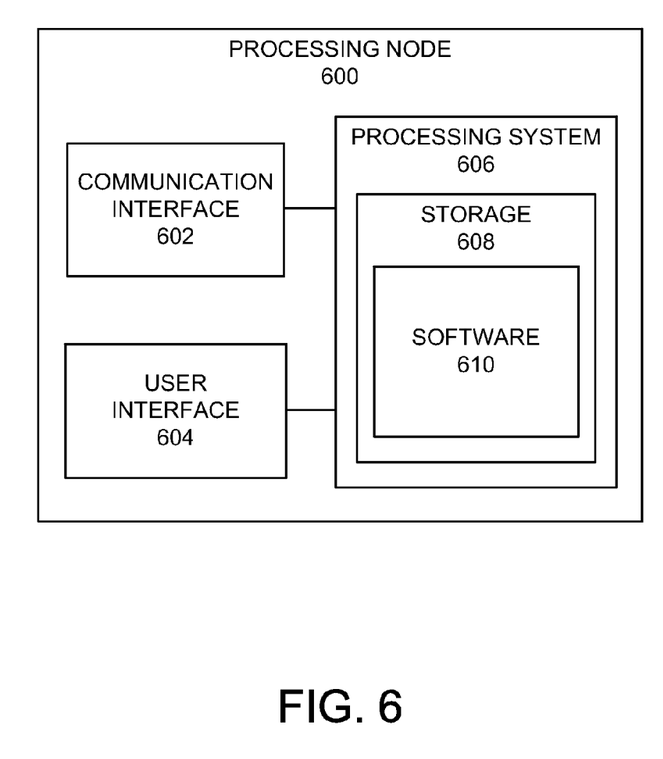
FIG. 6 illustrates an exemplary processing node.

FIG. 6 illustrates an exemplary processing node comprising communication interface 602, user interface 604, and processing system 606 in communication with communication interface 602 and user interface 604. Processing node 600 is capable of determining a data flow metric. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 includes test nodes 410, 420 and 422. Processing node 600 can also be an adjunct or component of a network element, such as an element of access nodes 108, 408 and 418. Processing node 700 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of determining a data flow metric in a wireless communication system, comprising:
sending a plurality of test packets to a plurality of wireless devices in communication with an access node;
determining a first inter-arrival gap and a first physical resource block-to-transmission time interval (PRB-TTI) ratio for each of the plurality of wireless devices during a first time period, and a first comparison of the first inter-arrival gap to the first PRB-TTI ratio for each wireless device;
determining a second inter-arrival gap and a second PRB-TTI ratio for each wireless device during a second time period, and a second comparison of the second inter-arrival gap to the second PRB-TTI ratio for each of the plurality of wireless devices; and
determining whether a data flow metric of the access node meets a data flow criteria based on the first and second comparisons, wherein the data flow metric comprises an indication of data flow burstiness of the access node.

2. The method of claim 1, further comprising:
determining a data use characteristic of an application running on each of the plurality of wireless devices; and
determining the data flow metric of the access node based on the first and second comparisons and the determined data use characteristic of the application running on each of the plurality of wireless devices.

3. The method of claim 1, wherein the determining the first inter-arrival gap and the first PRB-TTI ratio, the first comparison, the second inter-arrival gap and the first PRB-TTI ratio, and the second comparison are performed for each carrier used by each of the plurality of wireless devices.

4. The method of claim 1, wherein the determining the first inter-arrival gap and the first PRB-TTI ratio, the first comparison, the second inter-arrival gap and the first PRB-TTI ratio, and the second comparison are performed for a sector of the access node.

5. The method of claim 1, further comprising:
   determining a load on communication links from the access node to each of the plurality of wireless devices to test the determined load for quasi-stationary loading; and
   when it is determined that the load is not quasi-stationary loading, re-determining the first inter-arrival gap and the first PRB-TTI ratio, the first comparison, the second inter-arrival gap and the second PRB-TTI ratio, the second comparison, and the data flow metric of the access node based on the re-determined first and second comparisons.

6. The method of claim 1, wherein the first inter-arrival gap is determined based on a first modulation and coding scheme of each of the plurality of wireless devices, and the second inter-arrival is based on a second modulation and coding scheme of each of the plurality of wireless devices which is different than the first modulation and coding scheme.

7. The method of claim 1, further comprising:
   adjusting based on the determined data flow metric at least one of a number of carriers of the access node, a network entry criteria of the access node, a load balancing criteria of the access node, and a traffic shaping criteria of the access node.

8. The method of claim 1, further comprising:
   sending the plurality of test packets from a plurality of access nodes to the plurality of wireless devices in communication with one of the plurality of access nodes;
   determining the first inter-arrival gap, the first PRB-TTI ratio, the first comparison, the second inter-arrival gap, the second PRB-TTI ratio, and the second comparison of the inter-arrival gap to the PRB-TTI ratio for each wireless device per each of the plurality of access nodes; and
   determining the data flow metric of each of the plurality of access nodes based on the first and second comparisons.

9. A system for determining a data flow metric in a wireless communication system, comprising:
   a processing node configured to
      send a plurality of test packets to a plurality of wireless devices in communication with an access node;
      determine a first inter-arrival gap and a first physical resource block-to-transmission time interval (PRB-TTI) ratio for each wireless device during a first time period, and a first comparison of the first inter-arrival gap to the first PRB-TTI ratio for each of the plurality of wireless devices;
      determine a second inter-arrival gap and a second PRB-TTI ratio for each wireless device during a second time period, and a second comparison of the second inter-arrival gap to the second PRB-TTI ratio for each of the plurality of wireless devices; and
      determine whether a data flow metric of the access node meets a data flow criteria based on the first and second comparisons, wherein the data flow metric comprises an indication of data flow burstiness of the access node.

10. The system of claim 9, wherein the processing node is further configured to:
   determine a data use characteristic of an application running on each of the plurality of wireless devices; and
   determine the data flow metric of the access node based on the first and second comparisons and the determined data use characteristic of the application running on each of the plurality of wireless devices.

11. The system of claim 9, wherein the processing node determines the first inter-arrival gap and the first PRB-TTI ratio, the first comparison, the second inter-arrival gap and the first PRB-TTI ratio, and the second comparison for each carrier used by each of the plurality of wireless devices.

12. The system of claim 9, wherein the processing node determines the first inter-arrival gap and the first PRB-TTI ratio, the first comparison, the second inter-arrival gap and the first PRB-TTI ratio, and the second comparison for a sector of the access node.

13. The system of claim 9, wherein the processing node is further configured to:
   determine a load on communication links from the access node to each of the plurality of wireless devices to test the determined load for quasi-stationary loading; and
   when it is determined that the load is not quasi-stationary loading, re-determine the first inter-arrival gap and the first PRB-TTI ratio, the first comparison, the second inter-arrival gap and the second PRB-TTI ratio, the second comparison, and the data flow metric of the access node based on the re-determined first and second comparisons.

14. The system of claim 9, wherein the first inter-arrival gap is determined based on a first modulation and coding scheme of each of the plurality of wireless devices, and the second inter-arrival is based on a second modulation and coding scheme of each of the plurality of wireless devices which is different than the first modulation and coding scheme.

15. The system of claim 9, wherein the processing node is further configured to:
   adjust based on the determined data flow metric at least one of a number of carriers of the access node, a network entry criteria of the access node, a load balancing criteria of the access node, and a traffic shaping criteria of the access node.

16. The system of claim 9, wherein the processing node is further configured to:
   send the plurality of test packets from a plurality of access nodes to the plurality of wireless devices in communication with one of the plurality of access nodes;
   determine the first inter-arrival gap, the first PRB-TTI ratio, the first comparison, the second inter-arrival gap, the second PRB-TTI ratio, and the second comparison of the inter-arrival gap to the PRB-TTI ratio for each wireless device per each of the plurality of access nodes; and
   determine the data flow metric of the plurality of access nodes based on the first and second comparisons.

17. A system for determining a data flow metric in a wireless communication system, comprising:
   a plurality of first processing nodes configured to
      send a plurality of test packets to a plurality of wireless devices each in communication with an access node,
      determine a first inter-arrival gap and a first physical resource block-to-transmission time interval (PRB-TTI) ratio for each of the plurality of wireless devices during a first time period, and a first comparison of the first inter-arrival gap to the first PRB-TTI ratio for each of the plurality of wireless devices, and
      determine a second inter-arrival gap and a second PRB-TTI ratio for each of the plurality of wireless devices during a second time period, and a second comparison of the second inter-arrival gap to the second PRB-TTI ratio for each of the plurality of wireless devices; and
   a second processing node configured to
      receive the first and second comparisons from the plurality of first processing nodes and determine whether a data flow metric of the access node meets a data flow criteria based on the first and second comparisons, and adjust based on the data flow metric at least one of a number of carriers of the access node, a network entry criteria of the access node, a load balancing criteria of the access node, and a traffic shaping criteria of the access node.

18. The system of claim 17, wherein
the plurality of first processing nodes is further configured to determine a data use characteristic of an application running on each of the plurality of wireless devices; and
the second processing node is further configured to determine the data flow metric of the access node based on the first and second comparisons and the determined data use characteristic of the application running on each of the plurality of wireless devices.

* * * * *